United States Patent
Walker

(10) Patent No.: US 8,556,629 B2
(45) Date of Patent: Oct. 15, 2013

(54) OVERHEAD DOOR FORCIBLE ENTRY TRAINING DEVICE

(75) Inventor: Craig A. Walker, Georgetown, TX (US)

(73) Assignee: The Inforcer, LLC, Austin, TX (US)

( * ) Notice: Subject to any disclaimer, the term of this patent is extended or adjusted under 35 U.S.C. 154(b) by 469 days.

(21) Appl. No.: 12/789,143

(22) Filed: May 27, 2010

(65) Prior Publication Data

US 2010/0304344 A1  Dec. 2, 2010

Related U.S. Application Data

(60) Provisional application No. 61/182,036, filed on May 28, 2009.

(51) Int. Cl.
*G09B 19/00* (2006.01)

(52) U.S. Cl.
USPC .......................................................... 434/226

(58) Field of Classification Search
USPC .................. 434/226; 248/489, 495, 419, 172; 160/372, 129, 130
See application file for complete search history.

(56) References Cited

U.S. PATENT DOCUMENTS

| | | | | | |
|---|---|---|---|---|---|
| 383,117 | A | * | 5/1888 | Fitzgerald | 211/44 |
| 3,451,153 | A | * | 6/1969 | Dohanyos | 40/741 |
| 4,085,788 | A | * | 4/1978 | Bernardo | 160/133 |
| 4,304,078 | A | * | 12/1981 | Meriwether, Jr. | 52/127.2 |
| 4,738,296 | A | * | 4/1988 | Hatch | 160/133 |
| 4,922,659 | A | * | 5/1990 | Muccioli | 49/501 |
| 5,070,925 | A | * | 12/1991 | Paule | 160/133 |
| D327,797 | S | * | 7/1992 | Martin | D6/509 |
| 5,253,839 | A | * | 10/1993 | McClure | 248/354.1 |
| 5,906,493 | A | * | 5/1999 | Bishop | 434/226 |
| 5,927,731 | A | * | 7/1999 | Clarke | 280/79.7 |
| 6,976,339 | B1 | * | 12/2005 | Riccio et al. | 52/127.1 |
| 7,527,499 | B2 | * | 5/2009 | Schott | 434/226 |
| 7,900,683 | B2 | * | 3/2011 | DeCola | 160/264 |
| 8,167,621 | B2 | * | 5/2012 | Allen | 434/226 |
| 8,435,039 | B2 | * | 5/2013 | Paganin | 434/226 |

OTHER PUBLICATIONS

Roll-up Door Prop, Mar. 28, 2008, VentEnterSearch.com, pp. 1-2. <http://www.ventenersearch.com/?p=235>.*
Roll-up Door Prop, Mar. 28, 2008, VentEnterSearch.com, pp. 1-2. <http://www.vententersearch.com/?p=235>.*
Forcible Entry Class, Apr. 12, 2009, Washington State FOOLS forum, pp. 2-3. <http://www.swwafools.com/phpBB/viewtopic.php?f=2&t=864&start=30>.*

* cited by examiner

*Primary Examiner* — Gene Kim
*Assistant Examiner* — Alyssa Hylinski
(74) *Attorney, Agent, or Firm* — Law Offices of Mark L. Berrier

(57) ABSTRACT

A forcible entry training device for use with overhead doors includes an adjustable frame that is designed to hold a variety of overhead doors of different sizes, and also includes an adjustable support that applies support from the back of the door and thereby provides structural integrity to the door so that multiple vertical cuts can be made through the door. In one embodiment, vertical members in the frame are adjustably connected to horizontal members. Clamps are provided in the vertical members to secure the edges of the overhead door to the frame. Adjustable-length stabilizing legs can be used to hold the frame and door in an upright position, even when resting on an uneven surface.

14 Claims, 4 Drawing Sheets

OVERHEAD DOOR FORCIBLE ENTRY TRAINING DEVICE

CROSS-REFERENCE TO RELATED APPLICATIONS

This application claims the benefit of U.S. Provisional Patent Application 61/182,036, filed May 28, 2009, which is incorporated by reference as if set forth herein in its entirety.

BRIEF DESCRIPTION OF THE DRAWINGS

Other objects and advantages of the invention may become apparent upon reading the following detailed description and upon reference to the accompanying drawings.

Figure 1:
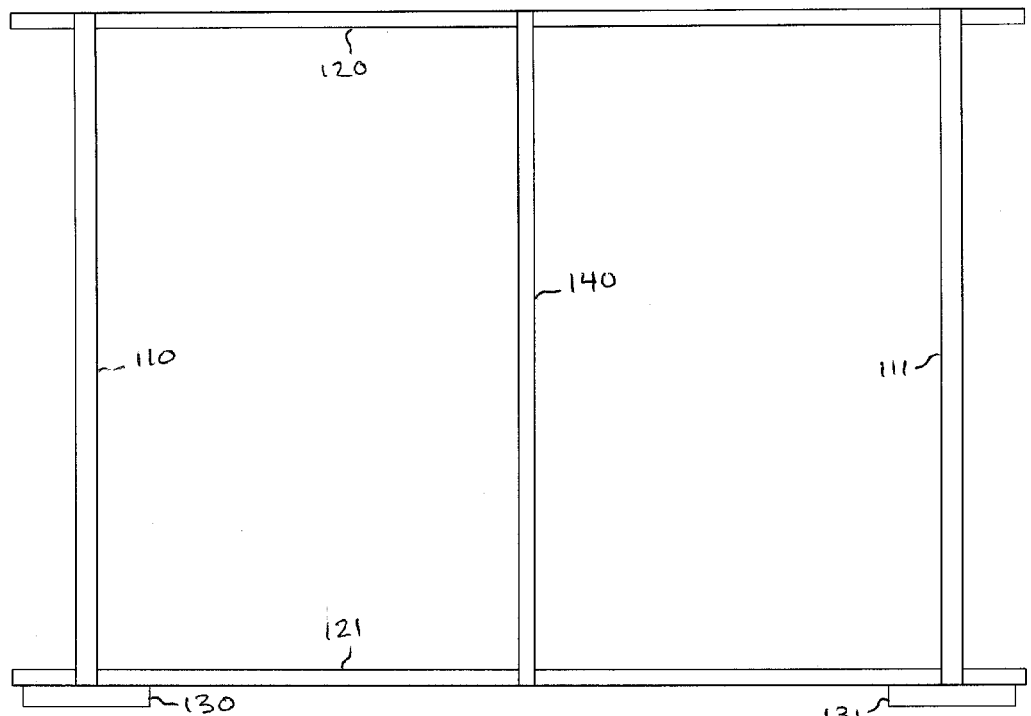
FIG. 1 is a simplified structural diagram illustrating the main components of a training device in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DESCRIPTION OF EXEMPLARY EMBODIMENTS

In order for firefighters to be able to effectively fight fires, they must be trained. A firefighter must be taught not only the techniques for actually putting out fires, but also techniques relating to their other responsibilities, such as gaining entry to structures and conducting rescue operations. One of the many important skills that must be learned by a firefighter is how to forcibly enter a building in order to gain access to the building. This may be necessary rescue persons that are trapped in the building, or to gain access to locations in the building that allow a fire to the more effectively controlled or extinguished.

One of the techniques that must be learned by firefighters is how to gain entry through a locked overhead door. These overhead doors include various types of doors, such as sectional garage doors and rolling steel doors/that are typically used to secure and protect garages and large openings in buildings. Typically, a cutoff saw is used to cut through the overhead door and to prevent the overhead door from closing after firefighters have entered the structure and thereby trapping the firefighters inside the structure.

In order to provide the most realistic training for entry through an overhead door, it is necessary for these types of doors to be set up so that trainees can actually cut through them as they would in a real-world scenario. Typically, this is accomplished by either cutting doors mounted into existing buildings (pre-demolition) or by building a makeshift frame that can support a garage door or other type of overhead door. The door can then be cut through with a saw.

This type of training for entry through an overhead door is problematic in several respects. For example, although destruction of an overhead door in the event of a fire or other emergency is of little concern, it is very expensive in the context of training to have to purchase an overhead door simply to have it destroyed in a single training exercise. Even if used or discarded overhead doors/gates could be obtained at less expense than new ones, the makeshift frame that supports the overhead door is typically constructed to support an overhead door of a particular height and width, and can only be used with a very limited number of doors/, whether new or donated.

One or more embodiments of the invention are described below. It should be noted that these and any other embodiments described below are exemplary and are intended to be illustrative of the invention rather than limiting.

The present training device provides improved means for training firefighters and other emergency personnel in techniques for gaining entry through overhead doors. The training device includes an adjustable frame that is designed to hold a variety of overhead doors of different sizes. The training device also includes an adjustable support that applies support from the back of the door and thereby provides structural integrity to the door allowing several vertical cuts to be made through the door. This allows multiple cuts to be made through the overhead door increasing the amount of cutting/training each overhead door provides, where in a conventional frame, the loss of structural integrity after the first cut make additional cuts difficult.

In one embodiment, the training device has a frame that is adjustable in both depth and width to accommodate many different sizes of doors. The training device includes adjustable hangers at the top of the frame to hold the top of an overhead door and side members that hold the sides of the door in place. An adjustably positioned center member applies support to the overhead door at one or more intermediate points between the side members in order to maintain the integrity of the door to allow multiple vertical cuts through the door. Supports attached to the frame hold the frame upright, but can be folded to facilitate transportation and storage of the device.

Referring to FIG. 1, a simplified structural diagram illustrating the main components of the training device is shown. In this figure, training device 100 has a frame that includes two vertical structural members 110 and 111, and two horizontal structural members, 120 and 121. Each of vertical structural members 110 and 111 has a base (130, 131) that rests on a support surface (e.g., a floor) and holds the vertical structural members upright. Each of horizontal structural members 120 and 121 is connected to both vertical structural member 110 and vertical structural member 111. The connections are adjustable so that the distance between vertical structural member 110 and vertical structural member 111 can be changed. This allows the training device to accommodate overhead doors of different widths.

Each of vertical structural members 110 and 111 includes means for holding one of the edges of an overhead door. These means may, for example, be clamps, bolts, hooks or other mechanisms suitable for securing an overhead door to the vertical structural members. Upper horizontal structural member 120 may also include means to secure the upper edge of the overhead door, although this is not necessary. When the overhead door has been secured to the vertical structural members, a brace (140) can be positioned on horizontal structural members 120 and 121 between vertical structural members 110 and 111. The position of brace 140 on horizontal structural members 120 and 121 is adjustable (i.e., the brace can be moved to the left or right in the figure). Brace 140 is configured to contact and apply pressure to a central portion of the overhead door and thereby stabilize the door. This is particularly helpful after the overhead door has been cut and consequently loses some of its structural integrity. The brace can be moved as cuts are made, so that the door continues to be sufficiently stable to allow additional cuts.

Figure 2:
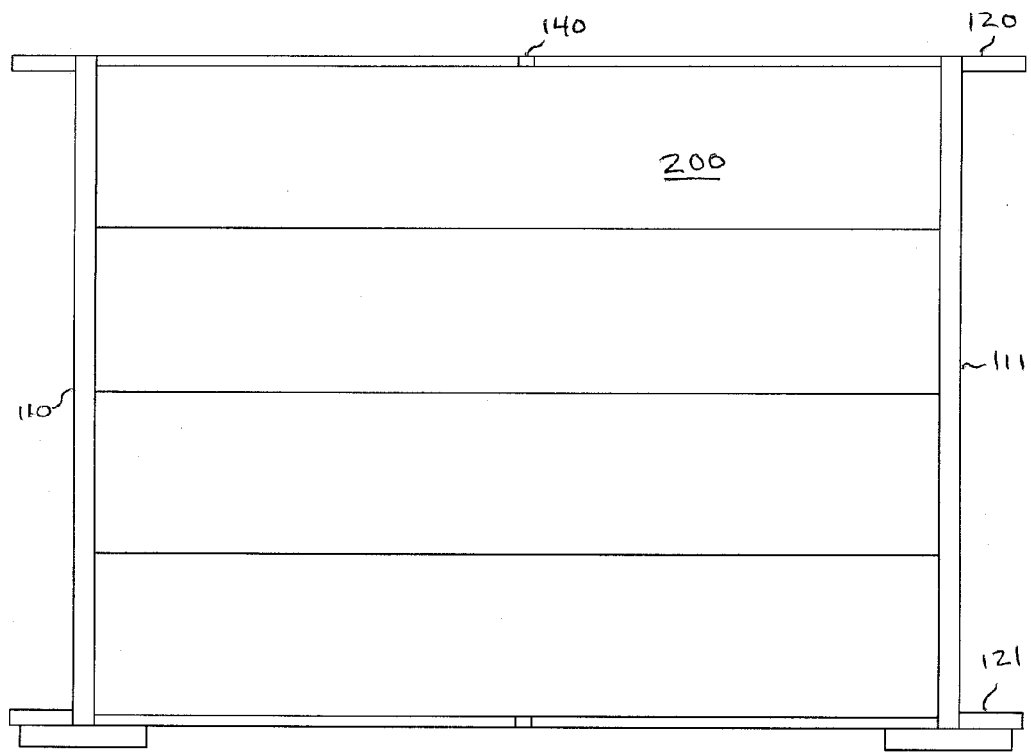
FIG. 2 is a diagram illustrating the training device of FIG. 1 with an overhead door secured thereto.

Referring to FIG. 2, a simplified diagram illustrating an overhead door when it is secured to the training device is shown. In this figure, overhead door 200 is a four-panel garage-type door, the left and right edges of which have been secured to the vertical structural members. Any other type of overhead door may also be mounted on the training device as well. As noted above, the width of the frame formed by vertical structural members 110 and 111 and horizontal structural members 120 and 121 may be adjusted to accommodate the door. The overhead door may also be mounted at any desired height on the vertical structural members. The brace (shown as a dotted line in this figure) is initially positioned near the midpoint between the vertical structural members, but can be moved as needed to stabilize the door as training is conducted and cuts are made on the door.

Figure 3:
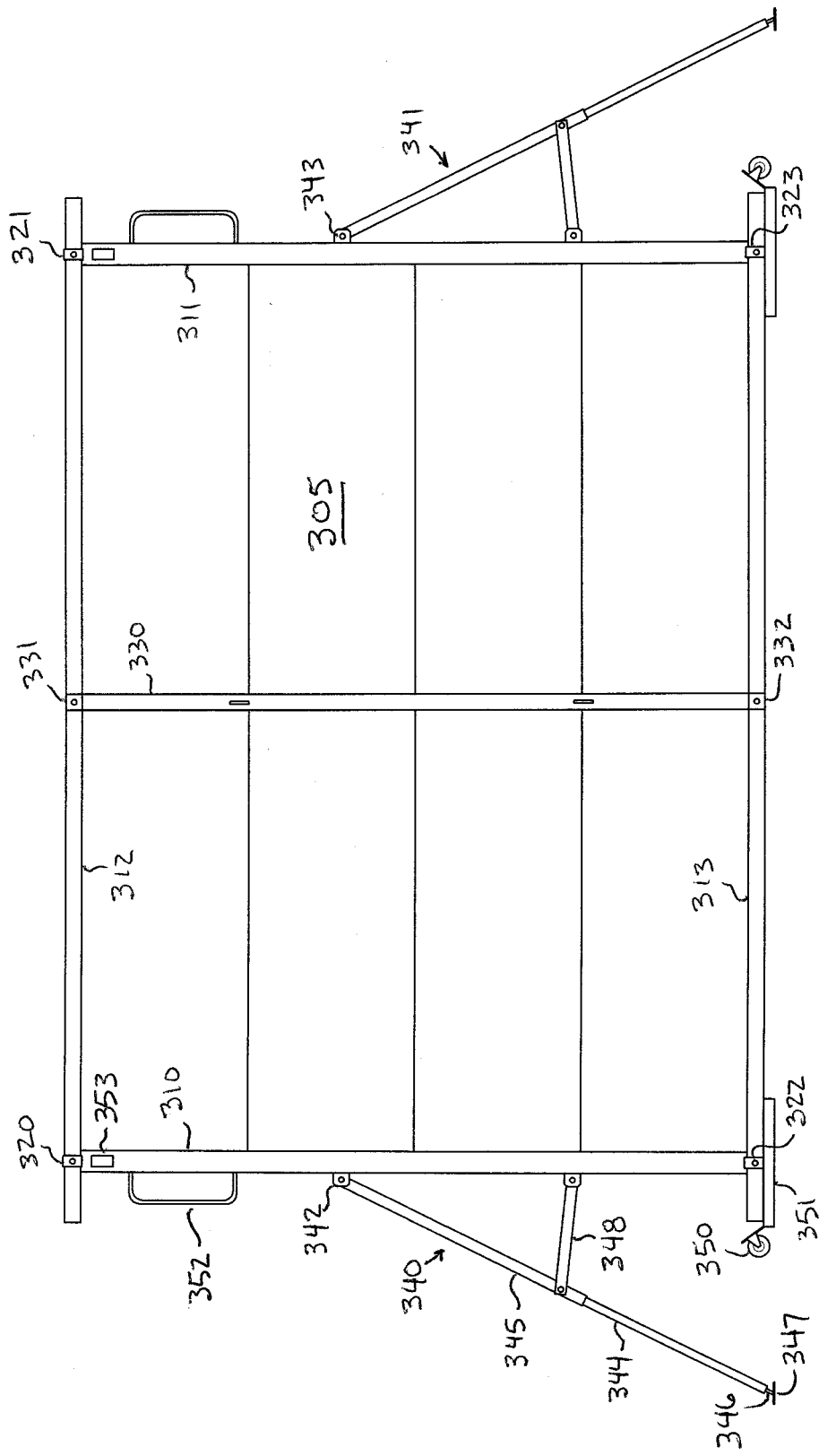
FIG. 3 is a diagram illustrating a detailed view of a training device in accordance with one embodiment.

Referring to FIG. 3, an exemplary embodiment 300 of the training device is shown in more detail. This is a rear view of the device. In other words, when the device is used, the person being trained will cut through the overhead door (305) from the side of the door opposite stabilizing brace 330 (i.e., the trainee will be facing out of the page).

In the embodiment of FIG. 3, training device 300 includes two vertical structural members 310 and 311. These uprights are connected to an upper horizontal member 312 and a lower horizontal member 313. Vertical structural members 310 and 311 are each adjustably connected to horizontal members 312 and 313. In this embodiment, the horizontal structural members are positioned through collars (320-323) that are attached to the upper and lower ends of the vertical structural members. The horizontal structural members slide through the collars, allowing the width of the training device to be adjusted to the width of an available overhead door. In this embodiment, the horizontal structural members are perforated square tubular steel of the type commonly used for street signs. The horizontal structural members and collars can be locked in position by pins that extend through the collars and horizontal structural members.

In the embodiment of FIG. 3, Vertical structural members 310 and 311 incorporate clamping mechanisms that secure the left and right edges of an overhead door to the training device. The clamping mechanism in each vertical structural member utilizes a clamping bar that extends along most of the length of the vertical structural member, although this is not necessary in alternative embodiments. The clamping mechanism will be described in more detail below. In this embodiment, no clamps or hangers are provided on the horizontal structural members, but they may be provided in other embodiments.

Adjustable brace 330 is connected to each of horizontal structural members 312 and 313. A hook or hanger (331, 332) is provided at each of the upper and lower ends of the brace to hang the brace on the horizontal structural members. The position of brace 330 on the horizontal structural members can be adjusted (i.e., the brace can be moved left or right in the figure). Pins can be placed through the hangers and the horizontal structural members to lock the brace into position on the horizontal structural members. Brace 330 includes an adjustable bracing mechanism to apply pressure to the overhead door when it is mounted on the training device. In one embodiment, the bracing mechanism uses a bar that extends along most of the length of the brace and can be moved outward from the brace to contact and apply pressure to the door. This will be described in more detail below.

In this embodiment, training device 300 includes adjustable folding legs (340, 341) attached to each of vertical structural members 310 and 311 to hold the training device upright during use. Two legs are attached to each vertical structural member. The legs are connected to the vertical structural members by a set of brackets (342, 343) that allow the legs to pivot between a storage/transport position in which the legs are parallel to the vertical structural members and a stabilizing position in which the legs extend outward at an angle from the vertical structural members. The legs are adjustable in length to allow the training device to be vertically positioned even on uneven ground. In this embodiment, a coarse adjustment of the length is provided by telescoping an inner leg member (e.g., 344) within an outer leg member (345). A fine adjustment is provided by rotating a threaded extension (346) at the end of the inner leg member. A pivoting/swiveling foot (347) at the end of the threaded extension distributes the force on the leg over an increased area on the ground (or other surface on which the training device rests).

In the embodiment of FIG. 3, the legs are constructed from perforated tubular steel. The outer leg member may, for example, use the same size tubular steel as the horizontal structural members. The inner leg member has a slightly smaller circumference so that it can fit within the outer leg member. A pin is placed through perforations in the inner and outer leg members to hold the inner leg member in place within the outer leg member. In one embodiment, a single pin can be used for this purpose, as well as to connect a supporting arm (348) to the leg. The supporting arm holds the leg in the outward, stabilizing position.

Training device 300 is designed to be easily assembled and disassembled to facilitate transportation and storage of the device. In order to disassemble the device, the pins are removed from hangers 331 and 332, and brace 330 is removed from horizontal structural members 312 and 313. Then, the pins are removed from collars 320-323 and horizontal structural members 312 and 313 are slid out of the collars. Legs 340 and 341 can be folded by removing the pins that connect support arms (e.g., 348) to the legs and keep the inner leg members in position within the outer leg members. The legs can then pivot into the storage position, parallel to the vertical structural members. Horizontal structural members 312 and 313 and brace 330 are relatively lightweight, and can be easily carried. Vertical structural members 310 and 311 are heavier, so wheels (e.g., 350) are attached to the base (e.g., 351) of each vertical structural member. When the vertical structural member is tilted toward the wheels, the wheels come into contact with the ground, allowing the vertical structural member to be rolled rather than carried.

Each vertical structural member also includes a handle (e.g., 352) to allow the vertical structural member to be more easily stood up or laid down. In one embodiment, short legs (e.g., 353) are provided on the upper ends of the vertical structural members so that, when they are laid on the ground, the short legs maintain the vertical structural members in a horizontal position. This may facilitate storage, or it may be more convenient to mount an overhead door on the training device when it is lying horizontally.

Figure 4A:
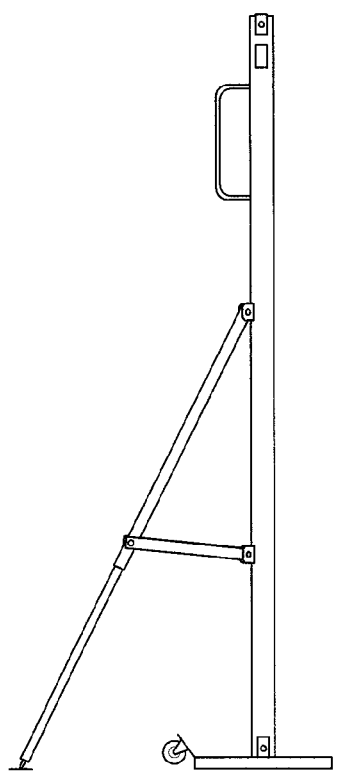
FIGS. 4A-4D are diagrams illustrating four views of a vertical structural member in accordance with one embodiment.
Figure 4B:
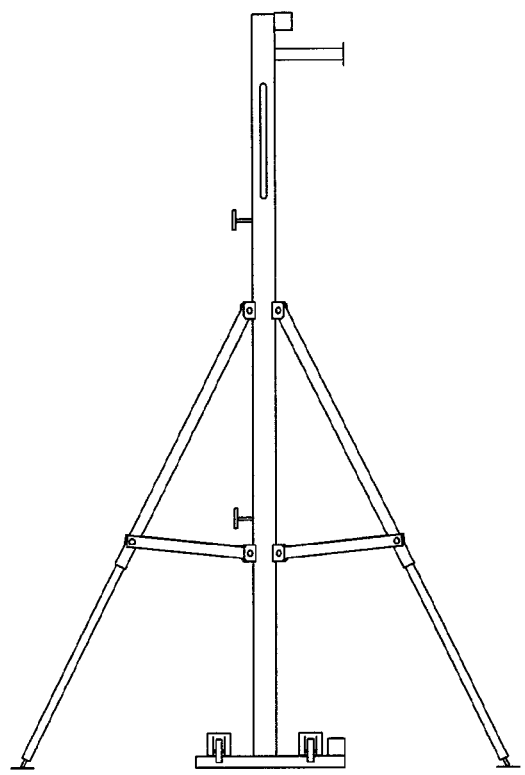
Figure 4C:
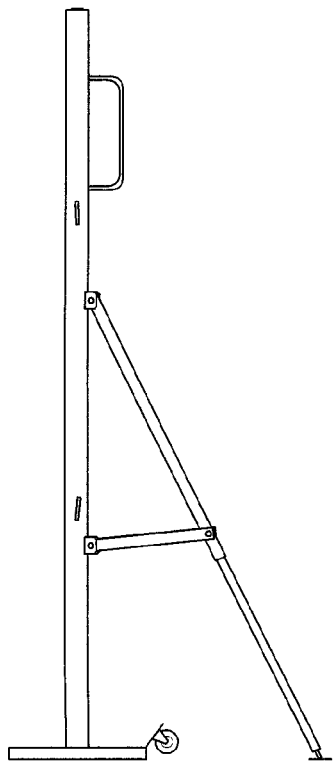
Figure 4D:
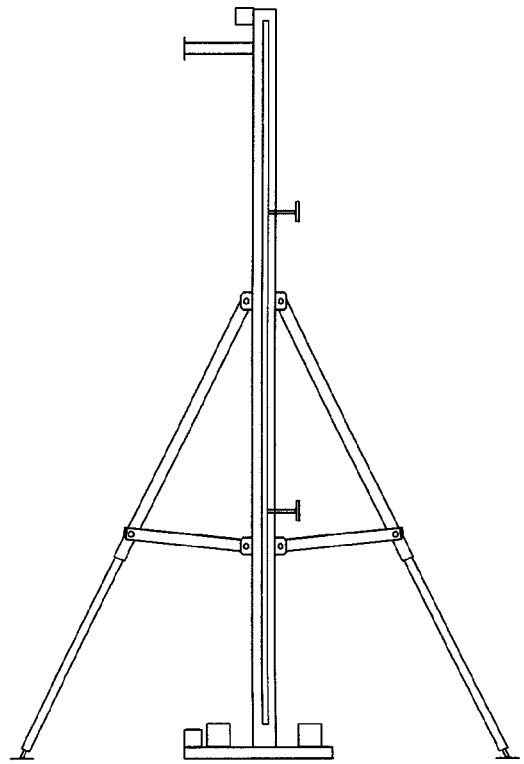

FIGS. 4A-4D are diagrams illustrating four views of vertical structural member 310. FIG. 4A is the rear of the vertical structural member (away from the trainee). FIG. 4B is the outside of the vertical structural member (away from the overhead door). FIG. 4C is the front of the vertical structural member (toward the trainee). FIG. 4D is the inside of the vertical structural member (toward the overhead door).

Figure 5:
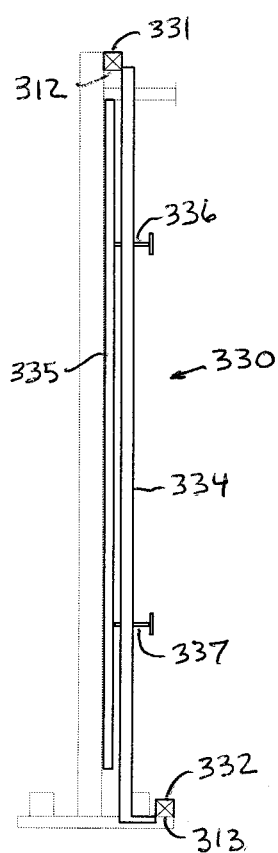
FIG. 5 is a diagram illustrating a side view of a stabilizing brace in accordance with one embodiment.

FIG. 5 is a diagram illustrating a side view of brace 330. This is a side view of the brace, with vertical structural member 311 shown in dotted lines behind the brace. Horizontal structural members 312 and 313 are indicated by the "X"'s in the figure. Brace 330 includes a vertical member 334 that extends from upper horizontal structural member 312 to lower horizontal structural member 313. Upper hanger 331 is attached to one end of vertical member 334, and lower hanger 332 is attached to the other end of the vertical member. As noted above, hangers 331 and 332 are used to attach the brace to the horizontal structural members.

A stabilizing bar 335 is attached to vertical member 334 by threaded bolts 336 and 337. The end of each of threaded bolts 336 and 337 is attached by a swiveling coupling to stabilizing bar 335 so that they remain connected when the bolts are rotated. Threaded bolts 336 and 337 pass through threaded apertures in vertical member 334 so that, when the bolts are rotated, stabilizing bar 335 is moved closer to, or farther from, vertical member 334. This allows stabilizing bar 335 to be moved into contact with the overhead door to stabilize the door. T-handles are provided at the ends of to threaded bolts 336 and 337 to facilitate adjustment of the position of stabilizing bar 335.

Figure 6A:
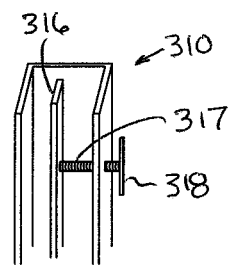
FIGS. 6A and 6B are diagrams illustrating a clamping mechanism utilized in the vertical structural members of one embodiment.
Figure 6B:
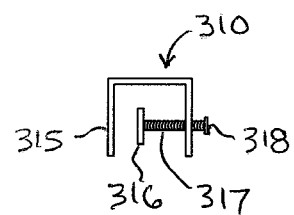

Referring to FIGS. 6A and 6B, diagrams illustrating the clamping mechanism utilized in the vertical structural members is shown. FIG. 6A is a perspective view of a section of vertical structural member 310, while FIG. 6B is a top view of the vertical structural member. It can be seen from this figure that the body of the vertical structural member is a C-channel beam. A clamping bar 316 is positioned inside the C-channel. Threaded bolts (e.g., 317) are positioned in corresponding threaded apertures in one side of the C-channel. One end of each threaded bolt is attached by a swiveling coupling to clamping bar 316. The other end of the threaded bolt has a T-handle to allow it to be rotated by hand. As the threaded bolts are rotated, clamping bar 316 is moved toward, or away from, a wall (315) of the C-channel, allowing the edge of the overhead door to be clamped to the vertical structural member (between clamping bar 316 and wall 315).

The embodiment of the training device described above is exemplary, and alternative embodiments of the invention may vary. For example, while the embodiment described above is configured to be easily assembled and disassembled, alternative embodiments may be permanently assembled. Similarly, alternative embodiments need not use the same mechanisms (e.g., adjustable folding legs) to support the device in an upright position. Further, rather than using an elongated bar and threaded bolts to clamp the overhead door to the training device, different types of clamps may be used, the door can be bolted to the frame of the device, hangers for the door may be provided, or other means can be used. Similarly, rather than the elongated stabilizing bar, alternative means such as bolts, springs, elastomeric material and the like can be used with the brace to stabilize the mounted overhead door. Still further, while the embodiment described above uses perforated tubular steel for the horizontal structural members and stabilizing legs, other materials or mechanical devices may be used in alternative embodiments. Numerous additional variations will be apparent to persons of skill in the art of the invention.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein and recited within the following claims.

What is claimed is:

1. An overhead door forcible entry training device comprising:
a frame configured to hold an overhead door in a substantially upright position, wherein the frame is adjustable to accommodate a plurality of overhead door widths, wherein the frame includes two vertical members, wherein the frame includes two horizontal members, wherein each of the vertical members is connected to each of the horizontal members, and wherein at least one of the vertical members is adjustably connected to the two horizontal members to enable a distance between the vertical members to be adjusted to a width of the overhead door; and
a brace connected to the frame, wherein the brace is connected to each of the horizontal members, and wherein the brace is configured to be adjustably positioned on the horizontal members wherein when the brace is moved toward a first one of the vertical members, the brace moves away from a second one of the vertical members, wherein the brace is configured to contact a portion of the overhead door that is between the two vertical members and thereby stabilize a vertical portion of the overhead door between the two vertical members when a vertical cut is made to the overhead door.

2. The training device of claim 1 wherein each of the vertical members includes one or more clamps configured to hold a corresponding vertical edge of the overhead door.

3. The training device of claim 2, wherein each of the vertical members comprises a C-channel member and wherein each of the vertical members includes an elongated clamping bar which is movable within the C-channel member to secure the edge of the overhead door between the clamping bar and the C-channel member.

4. The training device of claim 1, wherein the brace includes one or more contact members that are configured to maintain contact with the overhead door, wherein the contact members are movable toward or away from the overhead door to provide adjustable stabilizing pressure against the overhead door.

5. The training device of claim 1, further comprising a plurality of legs which are connected to the frame, wherein the legs are positionable to extend between the frame and a supporting surface, thereby holding the frame with the overhead door in the substantially upright position.

6. The training device of claim 5, wherein the legs are pivotally mounted to the vertical members and wherein the legs can be placed alternately in a storage position in which the legs are substantially parallel to the vertical members or in a stabilizing position in which the legs extend outward from the vertical members between the vertical members and the supporting surface.

7. The training device of claim 5, wherein one or more of the legs has an adjustable length.

8. The training device of claim 7, wherein one or more of the legs has both a coarse length adjustment and a fine length adjustment.

9. The training device of claim 1, further comprising the overhead door secured to the frame.

10. The training device of claim 1, wherein the brace includes a vertical brace member that has an upper end movably coupled to an upper one of the horizontal members and a lower end movably coupled to a lower one of the horizontal members, wherein the brace further includes an elongated vertical contact member adjustably coupled to the vertical brace member, wherein the elongated vertical contact member is movable toward or away from the overhead door, thereby providing adjustable stabilizing pressure against an elongated vertical portion of the overhead door.

11. The training device of claim 10, wherein the elongated vertical contact member extends from the upper one of the horizontal members to the lower one of the horizontal members.

12. A method for using an overhead door forcible entry training device, the method comprising:
   selecting an overhead door;
   adjusting the width of a training device to accommodate the overhead door, wherein the training device includes a frame having two vertical members configured to hold the overhead door in a substantially upright position, and a brace connected to the frame, wherein the brace is configured to contact a vertical portion of the overhead door that is between the two vertical members and thereby stabilize the overhead door between the two vertical members;
   securing the overhead door to the training device, wherein the overhead door is maintained in a substantially upright position;
   positioning the brace of the training device behind the overhead door, wherein the brace contacts a central vertical portion of the overhead door between the two vertical members and thereby stabilizes the overhead door
   making one or more training cuts in the overhead door,
   changing the position of the brace to move the brace toward a first one of the vertical members and away from a second one of the vertical members, and
   making one or more additional training cuts in the overhead door.

13. The method of claim 12, wherein the brace includes a vertical brace member that has an upper end movably coupled to an upper one of the horizontal members and a lower end movably coupled to a lower one of the horizontal members, wherein the brace further includes an elongated vertical contact member adjustably coupled to the vertical brace member, wherein the elongated vertical contact member is movable toward or away from the overhead door, thereby providing adjustable stabilizing pressure against an elongated vertical portion of the overhead door.

14. The method of claim 13, wherein the elongated vertical contact member extends from the upper one of the horizontal members to the lower one of the horizontal members.

\* \* \* \* \*